United States Patent [19]

Nash et al.

[11] Patent Number: 4,494,775

[45] Date of Patent: Jan. 22, 1985

[54] FLUID COUPLING

[75] Inventors: Robert W. Nash, Birmingham; Paul R. Andre, Farmington Hills; Dennis F. Knoblock, Utica, all of Mich.

[73] Assignee: William Nash Company, Inc., Farmington Hills, Mich.

[21] Appl. No.: 431,832

[22] Filed: Sep. 30, 1982

[51] Int. Cl.$^3$ ............................................. F16L 35/00
[52] U.S. Cl. ................... 285/26; 285/137 R; 285/310
[58] Field of Search ............... 285/137 R, 311, 420, 285/26, 310, 309

[56] References Cited

U.S. PATENT DOCUMENTS 1,878,826  9/1932  Cederstrom .................. 285/311
3,527,480  9/1970  Larson ................... 285/137 R X
3,642,307  2/1972  Brilkhouse et al. ............ 285/420 X
4,426,104  1/1984  Hazelrigg ............... 285/137 R X

FOREIGN PATENT DOCUMENTS 6873     4/1933  Australia ......................... 285/311
2142690  3/1973  Fed. Rep. of Germany ... 285/137 R Primary Examiner—Dave W. Arola
Attorney, Agent, or Firm—Gifford, VanOphem, Sheridan, Sprinkle & Nabozny

[57] ABSTRACT

A plural fluid coupling comprising a plurality of fluid connectors each of which has a male and female part which are movable with respect to each other between a fluidly connected and an unconnected position. The male parts of the fluid connectors are attached to a first plate while the female parts are attached to a second plate so that, with the plates positioned adjacent each other, the male and female parts of the fluid connectors are aligned with each other. A clamping assembly is pivotally connected to one plate and, upon actuation, moves the plates together and the fluid connector part to their fluidly connected positions.

4 Claims, 6 Drawing Figures

FLUID COUPLING

BACKGROUND OF THE INVENTION

I. Field of the Invention

The present invention relates generally to fluid couplings and, more particularly, to a fluid coupling having a plurality of separate fluid connectors.

II. Background of the Invention

In industrial welding equipment, it is necessary to fluidly connect the welding head to a plurality of different fluid or gas sources. Such gas sources can include, for example, an oxygen source, an acetylene source, a water source to cool the welding head and the like.

Typically, a plurality of hoses are connected at one end to the welding head and each hose has a fluid connector secured to its other end. These fluid connectors are, in turn, individually fluidly coupled to the various different fluid sources.

This previously known method of individually coupling each hose from the welding head and to its respective fluid source is not only time consuming to accomplish but also requires skilled personnel to assure that each hose is properly secured to its correct fluid source. Furthermore, the incorrect connection of the welding head hoses to the fluid sources can create a serious safety hazard.

SUMMARY OF THE PRESENT INVENTION

The present invention provides a fluid coupling which overcomes all the above mentioned disadvantages of the previously known devices.

In brief, the fluid coupling of the present invention comprises a plurality of fluid connectors wherein each fluid connector comprises a male part and a female part. The male and female parts of each fluid connector are axially movable with respect to each other between a fluidly connected position and a fluidly unconnected position.

The male parts of the fluid connectors are secured to a first plate while the female parts of the fluid connectors are secured to a second plate so that, with the plates positioned side by side and adjacent each other, the male and female parts of each fluid connector are aligned with each other. A clamp assembly is operable to move the plates together and thus simultaneously fluidly connect the male and female parts of each fluid connector.

When the fluid coupling of the present invention is used to connect a welding head to the various diverse fluid sources, the fluid connector parts on one plate are fluidly connected in a predetermined fashion to the welding head. Similarly, the fluid connector parts on the other plate are fluidly connected in the same predetermined order to the various fluid sources. Consequently, when the plates are clamped together, the male and female parts of each fluid connector are automatically joined together.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
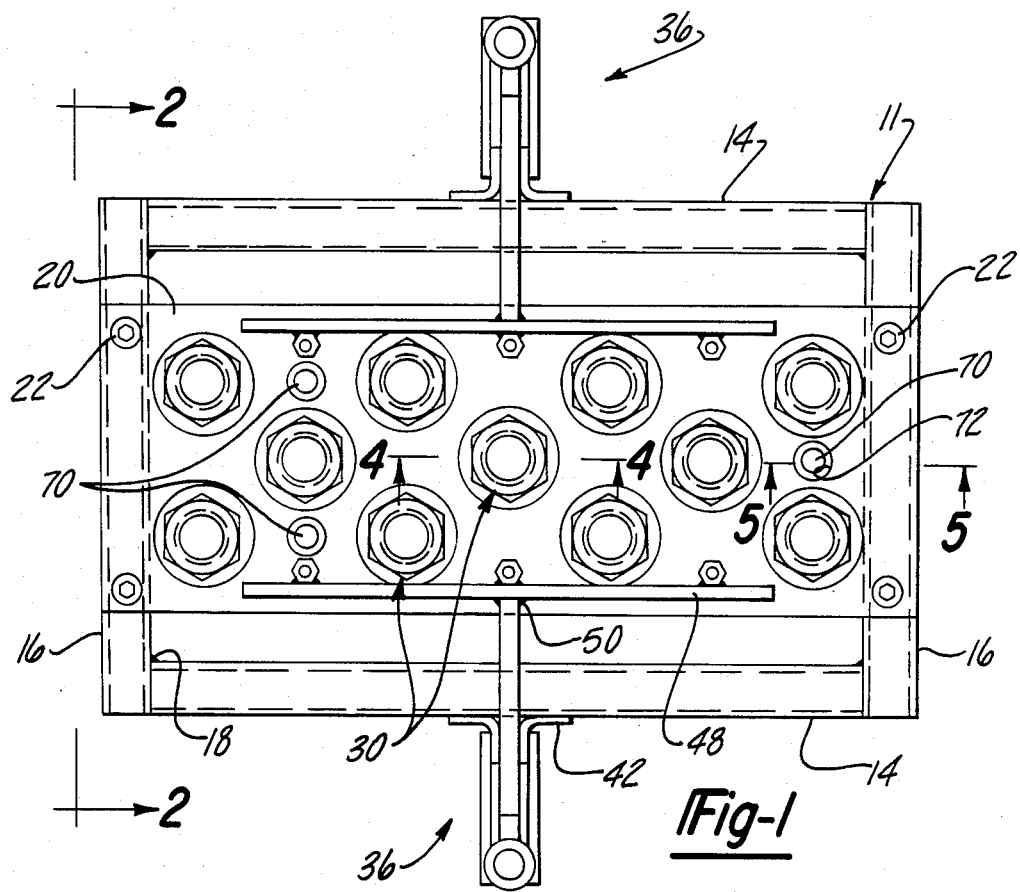
FIG. 1 is a top plan view of a preferred embodiment of the invention.
Figure 2:
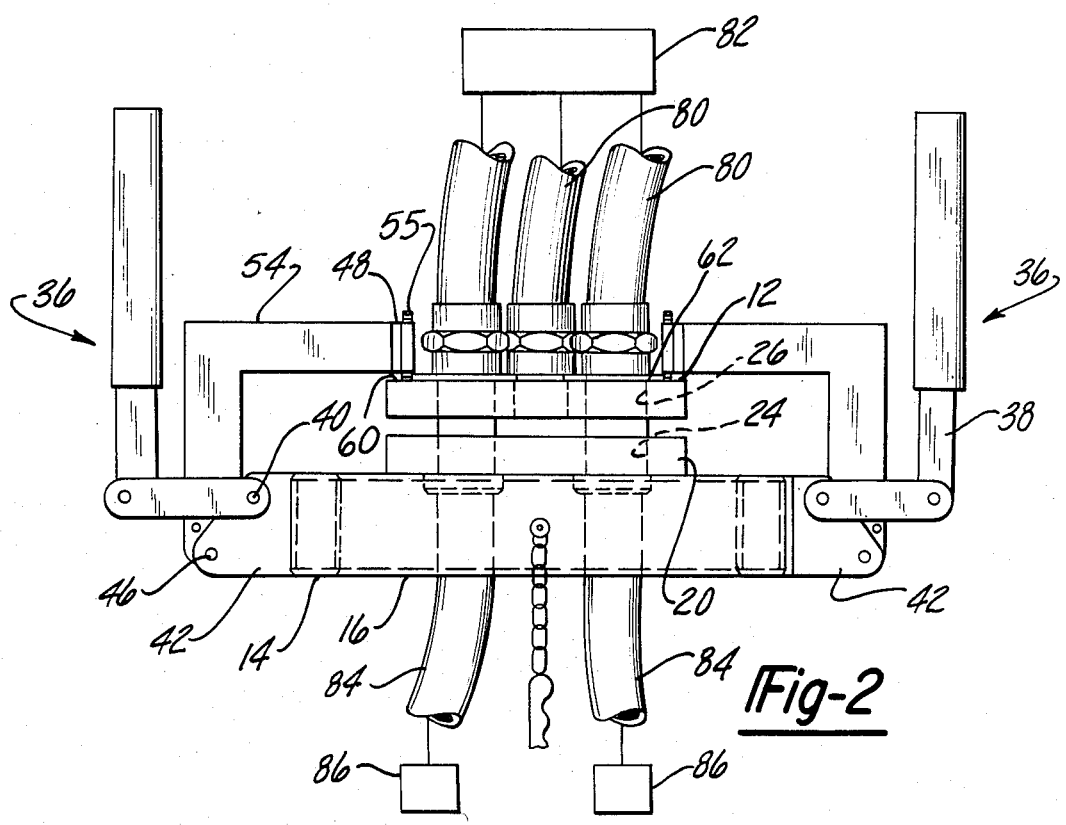
FIG. 2 is a side view taken substantially along line 2—2 in FIG. 1.

With reference first to FIGS. 1 and 2, a preferred embodiment of the fluid coupling of the present invention is thereshown and comprises a generally rectangular frame 11 having two side rails 14 and two end rails 16. The end rails 16 are secured to the side rails 14 in any conventional fashion, such as by welds 18. The frame 11 is preferably constructed from square metal tubing for its low cost and low weight characteristics.

A generally rectangular plate 20 is secured by screws 22 between the ends rails 16 of the frame 11. A plurality of holes 24 (FIGS. 2 and 4) are formed through the plate 20 at predetermined locations therealong. As shown in the drawing, three rows of four openings, three openings and four openings are formed along the plate 20.

Referring now particularly to FIG. 2, the coupling further comprises a second plate 12 which is generally rectangular in shape and is substantially the same size as the plate 20. A plurality of openings 26 (FIGS. 2 and 4) are formed through the plate 12 so that when the plate 12 is aligned side by side with the plate 20, one opening 26 in the plate 12 registers with one opening 24 in the plate 20.

Figure 4:
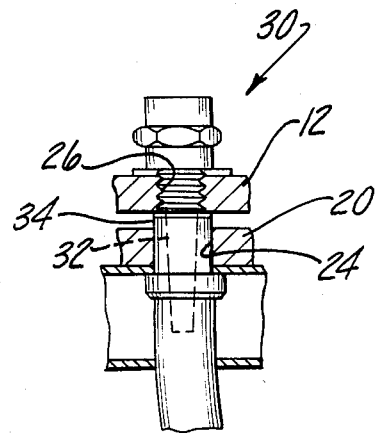
FIG. 4 is a fragmentary sectional view taken substantially along line 4—4 in FIG. 1.

With reference now to FIGS. 1 and 4, the fluid coupling of the present invention further comprises a plurality of fluid connectors 30 and each fluid connector 30 includes a male part 32 and a female part 34. One female part 34 is secured within each opening 24 of the plate 20 while, similarly, one male part 32 is secured within each opening 26 of the second housing 12. Consequently, with the housings 10 and 12 in side by side alignment with each other as shown in FIG. 2, one female part 34 is aligned with each male part 32.

Figure 6:
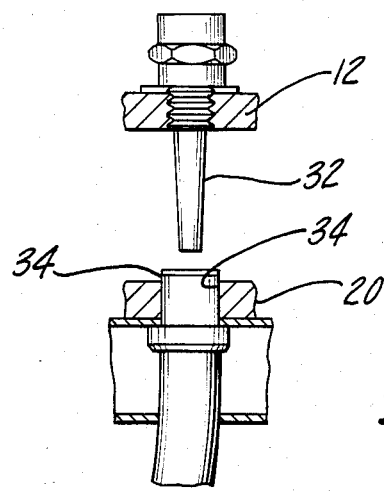
FIG. 6 is a view similar to FIG. 4 but showing the connector fluidly disconnected.

The fluid connector male and female parts 32 and 34, respectively, are conventional in construction so that a further description thereof is unnecessary. In brief, however, the male part 32 is insertable into the female part 34 to the position shown in solid line in FIG. 4, whereupon the male and female parts 32 and 34 are fluidly connected together. Conversely, the male and female parts 32 and 34 are fluidly disconnected when the male part 32 is removed from the female part 34 as shown in FIG. 6. The fluid connector 30 is also preferably of the quick connect and disconnect type so that, with the male part 32 disconnected from the female part 34, the female part 34 automatically closes.

Figure 3:
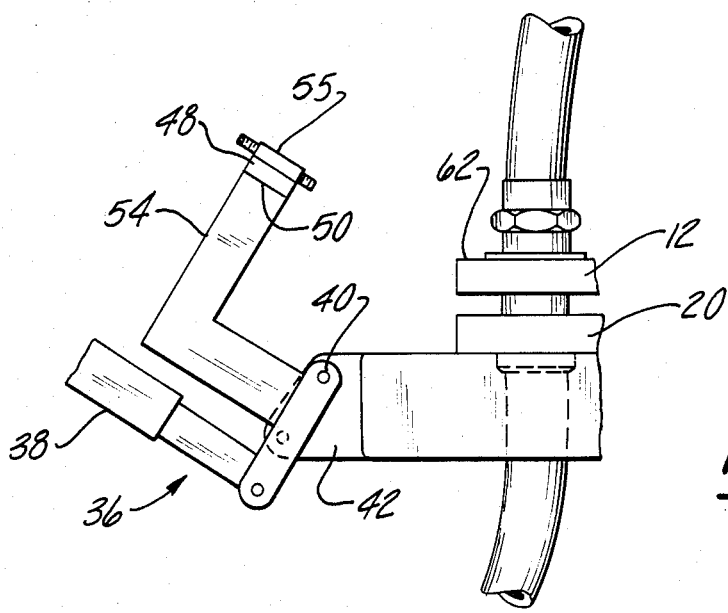
FIG. 3 is a fragmentary side view.

With reference to FIGS. 1-3, a pair of clamp assemblies 36 are provided for moving the second plate 12 towards the plate 20 and thus simultaneously moving the fluid connectors 30 from a fluidly unconnected and to a fluidly connected position. Each clamp assembly 36 comprises a lever 38 which is pivotally mounted by a pin 40 to a bracket 42 secured to each side rail 14 of the frame 11. Each lever 38 further cooperates with an L-shaped arm 54 having one end pivotally secured to the bracket 42 by a pin 46.

A bar 48 is secured by welds 50 across the other end of the L-shaped arm 54 so that, with the arm 44 in its clamping position (FIG. 2), the bar 48 of one clamping assembly 36 is positioned along one edge of the second plate 12. Similarly, the bar 48 of the other clamping assembly 36 is positioned along the opposite edge of the second plate 12. Adjustment bolts 54 are secured to each bar 48 so that, with the clamping assembly 36 in its clamped position, the bottom 60 of each adjustment bolt 54 abuts against one side 62 of the second plate 12.

The levers 38 of the clamping assembly 36 are movable between a non-clamping position, shown in FIG. 3, and a clamping position, shown in FIG. 2. With the levers 38 in their unclamped position, the lever 38 move the arms 44 outwardly and away from the second plate 12 the second plate 12 can be easily and rapidly removed and replaced with a new plate 12. Conversely, when the levers 38 are moved to their clamped position (FIG. 2), the adjustment bolts 54 abut against the side 62 of the second plate 12 and force the second plate 12 toward the plate 20 thus moving the fluid connector male and female parts 30 and 32 to their fluidly connected position.

Figure 5:
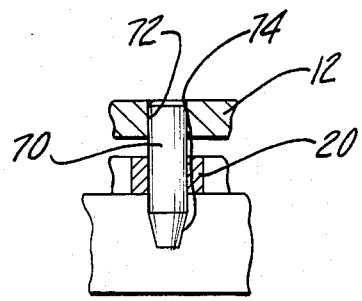
FIG. 5 is a fragmentary sectional view taken substantially along line 5—5 in FIG. 1.

With reference now to FIGS. 1 and 5, in order to prevent misalignment of the second housing 12 with respect to the plate 20, at least one and preferably three alignment pins 70 are secured to and extends outwardly from the plate 20. These alignment pins are received within the like shaped alignment holes 72 formed through the second housing 12. The alignment pins 70 are preferably asymmetrical about a center line extending through the side rails 74 of the frame 12 to ensure that there is only one proper orientation of the second plate 12 with respect to the first plate 20. In addition, the free end of each alignment pin 70 is preferably tapered as shown at 74 (FIG. 5) so that the alignment pins 70 both guide and align the second plate 12 with respect to the first plate 20.

With reference to FIG. 2, in use, the male fluid connector parts 32 are fluidly connected by hoses 80 to a fluid using device 82 such as a welding head. Similarly, the female parts 34 of the fluid connectors 30 are connected by conduits 84 to sources 86 of diverse fluids. For example, the sources of fluid can include acetylene, oxygen, water, and the like.

Thus, when it is desired to fluidly connect the fluid using device 82 to the sources 86 of fluid, the second plate 12 is positioned adjacent the first plate 20 and then moved to its fluidly connected position by the clamping assemblies 36. The fluid using device 82 is then ready for operation without the need for skilled labor. When it is desired to connect a different fluid using device 82, the plate 12 simply removed and replaced by a new plate 12 which has been previously configured to its particular fluid using device 82.

From the foregoing, it can be seen that the fluid coupling of the present invention provides a unique fluid coupling in which a plurality of different fluid using devices can be rapidly connected to sources of diverse operating fluids. Furthermore the device the of the present invention can be easily and safely used by unskilled labor.

Having described my invention, however, many modifications thereto will become apparent to those skilled in the art to which it pertains without deviation from the spirit of the invention defined by the scope of the appended claims.

I claim:

1. A plural fluid coupling comprising:
    a first plate,
    a plurality of fluid connectors, each fluid connector comprising a male part and a female part movable with respect to each other between a fluidly coupled position and a fluidly uncoupled position,
    means for securing said male parts of said fluid connectors to said first plate,
    a second plate,
    means for securing said female parts of said fluid connectors to said second plate so that, with said plates positioned adjacent each other, said male and female parts of each fluid connector are aligned with each other,
    means for moving said plates toward each other and said fluid connector parts from said uncoupled position to said coupled position,
    wherein each male part comprises an elongated tapered conduit slidably receivable in a opening formed in said female part,
    wherein said moving means comprises a pair of levers pivotally mounted to opposite sides of one of said plates and movable between a locking and a non-locking position, said levers each having an elongated portion which abut against and along opposite sides of the other of said plates when said levers are in said locking position, said lever elongated portions being spaced apart and parallel to each other, and
    wherein each lever elongated portion includes two ends which terminate adjacent opposite ends of the other of said plates when said levers are in said locking position
    means at spaced intervals along each of said lever elongated portions for varying the distance between each of said lever elongated portions and said one plate when said levers are in said locked position.

2. The invention as defined in claim 1 and comprising at least two alignment pins secured to and extending outwardly from one of said plates, said alignment pins being slidably received within alignment bores in the other plate when said fluid connector parts are moved to said fluidly connected position.

3. The invention as defined in claim 2 wherein each alignment pin includes an outer tapered end.

4. The invention as defined in claim 1 wherein said varying means comprises a plurality of threaded members which threadably engage said lever elongated portions.

* * * * *

UNITED STATES PATENT AND TRADEMARK OFFICE
CERTIFICATE OF CORRECTION

PATENT NO.   : 4,494,775
DATED        : January 22, 1985
INVENTOR(S)  : Robert W. Nash et al It is certified that error appears in the above-identified patent and that said Letters Patent is hereby corrected as shown below:

Column 2, line 42 delete "housing" insert --plate--.

Column 2, line 43 delete "housings 10" insert --plates 20--.

Column 3, line 2 delete "44" insert --54--.

Column 3, line 7 delete "54" insert --55--.

Column 3, line 10 delete "54" insert --55--.

Column 3, line 14 delete "lever" insert --levers--.

Column 3, line 15 delete "44" insert --54--.

Column 3, line 22 delete "30 and 32" insert --32 and 34--.

Column 3, line 25 delete "housing" insert --plate--.

Column 3, line 28 after "pins" insert --70--.

Column 3, line 32 delete "12" insert --11--.

Column 3, line 32 delete "rails 74" insert --rails 14--.

Column 3, line 35 delete "tappered" insert --tapered--.

Column 3, line 36 delete "tappered" insert --tapered--.

Column 3, line 53 after "12" insert --is--.

Column 3, line 60 after "device" delete --the--.

Signed and Sealed this

Eighth Day of October 1985

[SEAL]

Attest:

DONALD J. QUIGG

Attesting Officer

Commissioner of Patents and
Trademarks—Designate